United States Patent [19]
Staheli

[11] Patent Number: 5,758,479
[45] Date of Patent: Jun. 2, 1998

[54] METHOD AND DEVICE FOR HAY PRODUCTION

[75] Inventor: David H. Staheli, Cedar City, Utah

[73] Assignee: David Staheli, Cedar City, Utah

[21] Appl. No.: 551,892

[22] Filed: Oct. 23, 1995

Related U.S. Application Data

[63] Continuation-in-part of Ser. No. 450,867, May 26, 1995, abandoned.

[51] Int. Cl.$^6$ ............................................. A01D 14/02
[52] U.S. Cl. ......................... 56/16.4 R; 56/16.8; 56/341; 56/DIG. 2; 100/74
[58] Field of Search .................... 56/341, 16.4 R, 56/16.8, DIG. 2; 100/47, 73, 74, 75, 88

[56] References Cited

U.S. PATENT DOCUMENTS

| | | | |
|---|---|---|---|
| 3,280,543 | 10/1966 | Lawrence et al. | 100/73 |
| 3,430,583 | 3/1969 | Pool et al. | 100/74 X |
| 3,585,730 | 6/1971 | Morse | 56/DIG. 2 X |
| 3,834,141 | 9/1974 | Bracht et al. | 100/74 X |
| 4,254,605 | 3/1981 | Maher et al. | |
| 4,257,215 | 3/1981 | Maher et al. | 56/16.4 R X |
| 4,325,209 | 4/1982 | Cicci | 56/16.4 R X |
| 4,335,855 | 6/1982 | Staskal et al. | 100/74 X |
| 4,551,968 | 11/1985 | Samuelsson | 56/16.4 |
| 4,604,857 | 8/1986 | Maher | |
| 4,812,741 | 3/1989 | Stowell | |
| 4,868,491 | 9/1989 | Black | |
| 4,873,772 | 10/1989 | Maher | |
| 4,885,531 | 12/1989 | Stowell | |
| 4,918,910 | 4/1990 | Sheehan et al. | 56/16.4 R X |
| 4,991,342 | 2/1991 | Maher et al. | |
| 5,060,459 | 10/1991 | Herron | |
| 5,301,607 | 4/1994 | Stromer et al. | 56/341 X |
| 5,327,708 | 7/1994 | Gerrish | 56/DIG. 2 X |

FOREIGN PATENT DOCUMENTS

| | | | |
|---|---|---|---|
| 19276 | 12/1928 | Netherlands | 100/75 |
| 328222 | 3/1972 | U.S.S.R. | 100/74 |
| 1327832 | 8/1987 | U.S.S.R. | 56/16.4 R |
| 1618324 | 1/1991 | U.S.S.R. | 56/16.4 |

*Primary Examiner*—John A. Ricci
*Assistant Examiner*—Christopher J. Novosad
*Attorney, Agent, or Firm*—Thorpe, North & Western, LLP

[57] ABSTRACT

A method and device for harvesting hay are disclosed. The method includes injecting steam into hay as it is being processed by a baler. Typically, the hay will be subjected to steam as it is lifted into the baler, and then subjected to steam as it passes through a feed chamber of the baler. Preferentially, the hay will be saturated with steam less than two seconds before it is formed into a bale of hay. The device includes a conventional baler having one or more steam manifolds disposed so as to emit steam into the hay between the point it is picked up by a pick-up mechanism, and the point at which it is ultimately formed into a bale of hay. By saturating the hay with steam, dew moisturization is simulated and less loss occurs. However, the moisture content reading in the resulting bale of hay decreases much more rapidly than dew moistened hay, thus decreasing spoilage and increasing the amount which may be sold to the most lucrative markets. The invention also includes a method for improving the absorption of moisture from the steam which includes cooling the hay prior to application of the steam.

43 Claims, 6 Drawing Sheets

METHOD AND DEVICE FOR HAY PRODUCTION

RELATED APPLICATIONS

The present application is a continuation-in-part of U.S. patent application Ser. No. 08/450,867, filed May 26, 1995, now abandoned.

BACKGROUND OF THE INVENTION

The present invention relates to a method and device for hay production, and in particular, to a method and device for steam treating hay so as to achieve a consistent, desired moisture level in the hay.

In hay production operations, the producer is faced with numerous obstacles as he attempts to cut, cure, bale and store high quality feed. Weather, other atmospheric conditions and machinery requirements are a few of the major challenges which must be overcome in a successful harvest. Of the various types of hay, alfalfa is especially challenging due to the narrow range of moisture content which must be present in the hay when it is harvested using the baling method. If the moisture content of the hay is too high, there is a significant risk that the hay will spoil and that the commercial value of the hay will be significantly reduced. If the moisture content is too low, a considerable amount of the hay is lost during the harvesting process.

In the past, after the hay was cut and sufficiently cured, hay producers were forced to rely upon the natural dew process to get proper moisture conditions for hay baling operations. Such was especially true for alfalfa and some other leafy, legume-type forages. This was typically done by waiting to bale the hay until the evening when falling temperatures cause dew to form on the hay. While considerable time was lost waiting for appropriate dew conditions to develop, crops were also often lost as, within a relatively short period of time, the dew forming on the hay was sufficient to reach an unacceptably high moisture content. The producer was then faced with the choice of waiting until the next day (and hoping that dew would form again) or to continue to bale and risk some spoilage of the resulting hay bales.

To avoid such a choice, many producers have invested large sums of money in harvesting equipment to have sufficient equipment to harvest the hay within the brief window when moisture conditions are ideal. However, such large expenditures for equipment which remains idle most of the time is extremely wasteful and decreases the producer's financial productivity. Furthermore, even in the best of operations there is a significant percentage of hay crops which are either lost or heavily devalued due to moisture problems.

These problems are exacerbated in the more arid western United States and other areas of the world where atmospheric conditions prevent dew formations for prolonged periods of time. Baling the hay under completely dry conditions causes a huge loss of the most valuable leafy portion of the forage, the shattering of the stemmed portion, loss of protein and other feed values, extreme difficulty in loading, hauling and feeding and great losses in market value.

In attempts to overcome these concerns, some producers spray the windrows of hay with water. However, such attempts are generally unsuccessful because the water droplets are not easily absorbed into the dried hay. Additionally, only hay disposed on the outside of the windrow receives moisture. Thus, a natural dew-like condition cannot be achieved using this method.

Another irony which presents a significant financial burden on hay farmers is that the desired baling moisture content is not the desired moisture content in the baled hay. For example, a desired baling moisture typically may be between 18 and 25 percent. At such moisture levels, the hay has a soft flexible nature which prevents the loss of the leaf and other important portions of the hay during baling. However, when storing and shipping hay, a desired moisture content is less than 15 percent, and preferably about 12 percent. If the moisture content in the hay is much higher, the hay in the center of the bale will spoil.

In an attempt to overcome the discrepancy between ideal baling moisture and ideal storage/shipping moisture, many hay farmers will bale at moisture contents between 18 and 25 percent and then allow the bales to sit in a hay stack until the moisture content has fallen below 15 percent. This process, however, can take weeks for smaller bales, and months for larger bales. If for some reason the moisture content of the hay does not decrease during this time, e.g., due to a sudden period of high humidity and substantial rain, a significant amount of the hay may be lost to spoilage.

Furthermore, the farmer loses time and money waiting for the hay to dry.

In a more recent attempt to resolve the concerns regarding insufficient moisture, attempts were made to introduce moisture by placing the hay in a steam filled chamber which traveled along the windrows shortly before baling. An example of such attempts are contained in U.S. Pat. Nos. 4,254,605, 4,604,857, 4,873,772, and 4,991,342. These attempts recognized that steam is much more easily absorbed by the dry cured plant tissue than are small droplets of waters. By weight, steam has a volume of over 1000 times that of water. When a windrow of cured hay is subjected to steam, the steam instantly condenses onto the cool, dry plant tissue with which it comes into contact. This causes very rapid absorption of the water into the plant tissue.

The prior attempts to use steam, however, have not been widely accepted. By attempting to cover the hay in a container and then emit steam about the hay, these devices and methods resulted in insufficient penetration into the hay in the center of the windrow, and required that the hay be harvested at speeds much slower than currently available harvesting machines are capable of traveling.

An additional problem with such attempts is that as soon as the hay passes out of the chamber the steam quickly evaporates as the hay is picked up for passage through the baler. Often hay which has achieved a moisture content above the desired 18 percent in the chamber, will fall well below 18 percent as it is being passed into the baler. The lower moisture content of the hay results in the breakage of leafy forage and other valuable portions of the plant.

In accordance with the present invention, it has been found that the only way to overcome these complications with the prior art machines is to supersaturate the hay with steam, i.e. attempt to achieve a moisture content well above the 25 percent, so that evaporation of the steam will result in a moisture content within the desired range. However, supersaturation causes several major problems. First, the locations which require the addition of moisture to the steam are generally arid and the use of the excessive amount of water required to achieve supersaturation wastes a valuable resource. Second, the use of large amounts of water slows the harvesting process as the water storage tanks must be refilled frequently to supply the water for the steam. The harvesting process must be further slowed to allow the steam sufficient time to penetrate the windrow to moisturize the hay at the center of the windrow. Third, the costs increase significantly as considerably more fuel is required to generate sufficient steam to supersaturate the hay.

Thus, prior to the present invention, there has been no viable method to bale hay with proper moisture levels other than to rely on natural dew formation. Because of this, only 30 to 40 percent of most producers' hay is acceptable as high grade feed, the most lucrative market. The remaining hay either spoils due to high moisture, or is sold for lesser amounts because of loss of valuable portions of the hay. As will be discussed in detail below, the present invention enables producers to obtain consistent, high quality harvests without relying on natural dew formation, and without slowing the harvesting process.

SUMMARY OF THE INVENTION

Thus, it is an object of the present invention to provide a method for treating cured hay with steam so as to achieve a desired, consistent moisture content in the hay just prior to baling.

It is another object of the present invention to provide such a method which is easy to use and inexpensive.

It is yet another object of the present invention to provide a machine which steam treats hay by treating the hay with steam as it is being harvested, i.e. lifted into the baler or inside the baler, to ensure a consistent, desired hay moisture content.

It is still another object of the present invention to develop such a machine which is usable with conventional tractors and trucks.

It is an additional object of the present invention to provide such a machine which allows the producer to vary the amount of steam being injected into the hay so as to maintain consistent moisture content, even when the moisture content of the hay changes.

It is an additional object of the invention to develop a method for treating hay so as to simulate a desired moisture content at baling and obtain a significantly lower moisture content within a short time thereafter.

It is still yet another object of the invention to develop a method for treating hay which can be conducted by retrofitted, existing hay balers, so as to minimize the expense to the farmer.

Yet an additional object of the invention is to maximize steam absorption by the hay as it is being baled.

The above and other objects of the invention are realized in specific illustrated embodiments of a dew simulator including a steam generation mechanism which is disposed in communication with a plurality of steam sprayer nozzles disposed at a pick/up mechanism of the baler and/or within the baler. As the hay is lifted into and passed through the baler, the hay is subjected to sufficient steam that the hay contains a desired simulated moisture content for baling, typically between 18 and 25 percent moisture content reading on a conventional moisture meter.

In accordance with one aspect of the invention, the dew simulator has sensors for detecting the moisture content of the hay and a regulator valve for controlling the amount of steam emitted into the hay so that an operator of the dew simulator is able to select the desired moisture content of the hay and maintain that moisture content, even if the original moisture content of the hay changes as the baler moves along the windrow.

In accordance with another aspect of the invention, the steam sprayer nozzles are disposed so as to treat the hay with steam up to less than 1 second before the hay is baled, or precompressed as in some large balers.

In accordance with yet another aspect of the present invention, a conventional baler can be retrofitted with steam spraying nozzles so as to enable a conventional baler to treat hay as it is being harvested.

In accordance with still another aspect of the present invention, it has been found that treating the hay with steam momentarily before baling, a farmer can obtain all of the benefits of harvesting at a high moisture content, while obtaining bales of hay having an actual moisture content between about 11 and 15 percent. For example, when treating the hay immediately before baling, the amount of steam being released into the hay can be set to achieve a moisture content reading of approximately 25 percent. At such a reading, the hay has the texture and flexibility of hay which has dew derived moisture of approximately 25 percent and very little hay is lost during the harvesting process. However, the actual amount of moisture added to the hay as steam is typically about one-half the increase indicated by the moisture reading.

In accordance with the present invention, it has been found that the addition of approximately 10 percent actual moisture by weight in the form of steam provides moisture readings which would indicate the addition of 20 percent moisture by weight. The treated hay also has baling characteristics, i.e. flexibility, decreased fragmentation, etc., which are consistent with hay having a 20 percent increase. However, within one to two days, the moisture readings drop back to or slightly below the level that would been present with a 10 percent increase in moisture content. In other words, when using steam to add moisture to the hay, one can simulate a 20 percent moisture increase while only adding 10 percent.

This unexpected effect is likely due to steam being absorbed into the exterior plant tissues almost immediately, but not necessarily into the individual cells. The presence of water between the cells allows for the higher moisture content readings and improved harvesting characteristics. The rapid decrease in the moisture readings within 1 or 2 days is likely due partially to evaporation and more significantly to absorption of moisture on the cellular/molecular level. Once the moisture content has stabilized within the hay, the moisture readings provide readings of the actual moisture content.

This effect has been measured by determining the actual amount of water which is added to a bale of hay as steam. The measurements indicate that the steam treated hay had moisture content readings which were nearly double the amount of water added. However, within one to two days, the moisture levels fell to at or below the moisture readings anticipated based on the amount of steam added.

Because of this unexpected effect, the bales of hay formed in accordance with the present invention do not require weeks or months to drop to a moisture content readings below 15 percent. Rather, the hay baled in accordance with the principles of the present invention falls to a moisture content readings of less than 15 percent within one to two days, and typically reaches an ideal shipping moisture content of about 12 percent within as little as two to three days. This is due to the fact that the steam penetrates primarily the outermost tissue of the hay to give it the desired characteristics for baling. However, once the hay is baled, the outer tissues quickly reach a moisture content equilibrium with the remaining tissue on a cellular or molecular level. This equalization of the actual moisture content provides accurate readings of actual moisture on a convention moisture meter; readings which are about one-half of the amount simulated by steam treatment. By this time, the hay has been baled and the loss to the valuable leafy portions of the plant has been greatly diminished due to the temporary, simulated increase in moisture content.

In accordance with yet another aspect of the invention, when the hay is being harvested during hot weather, the hay is cooled momentarily before application of the steam to further simulate dew forming on the hay and to increase absorption of the steam by the hay. The hay is typically cooled by subjecting the hay to cool air generated by an evaporative cooler or a refrigerant based cooler within about 3 seconds of application of the steam. The hay may also be cooled by spraying water onto the hay and then blowing air across the hay to evaporate the water. The evaporation of the water consumes heat, some of which is drawn from the hay in the windrow.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
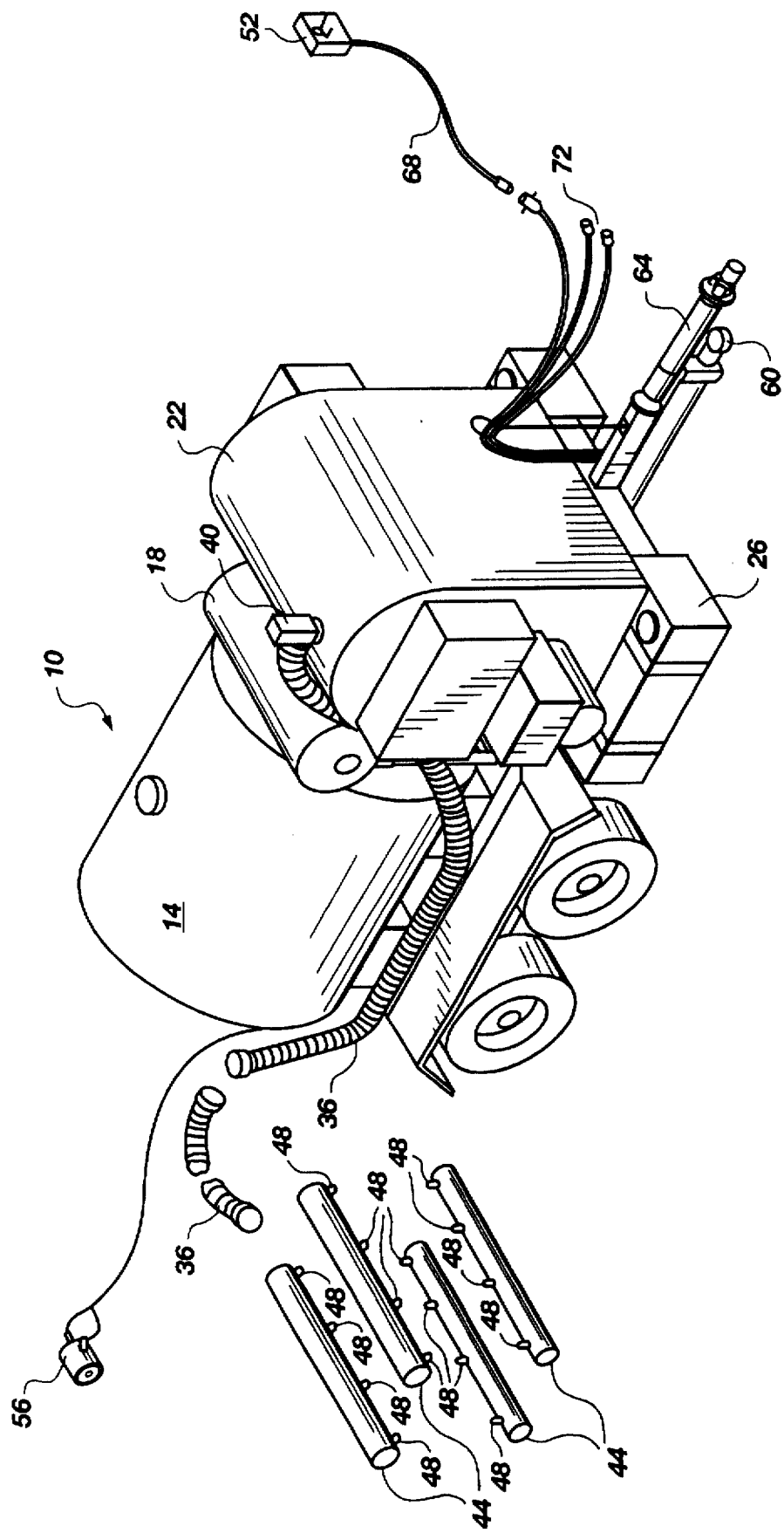
FIG. 1 shows a partially exploded, perspective view of the components of a dew simulator having a boiler system, a water supply system and a steam injection system in accordance with the principles of the present invention.

Reference will now be made to the drawings in which the various elements of the present invention will be given numeral designations and in which the invention will be discussed so as to enable one skilled in the art to make and use the invention. Referring to FIG. 1, there is shown a dew simulator, generally indicated at 10, made in accordance with the principles of the present invention. The dew simulator 10 includes a water supply tank 14 for holding a large supply of water. In dry climates, as much as 200 pounds of steam is needed per ton of hay. Many baling machines have a hay baling capacity of 12 to 25 tons per hour. Thus, the water supply tank 14 should be sufficiently large to treat a considerable amount of hay before refilling of the tank is required.

Disposed adjacent to the water supply tank 14 is a boiler feedwater system 18. The boiler feedwater system 18 preheats water as it is pumped from the large supply tank to a boiler or steam generator 22. The water is preheated in the feedwater system 18 to a temperature just under the boiling point to eliminate excess oxygen and other corrosive gasses before the water passes into a steam generator 22. Excess oxygen may also be eliminated chemically using sodium sulfite or other suitable chemicals. These may be used in place of or as an augmentation to the feedwater system 18.

Once through the feedwater system 18, the treated water is turned to steam in the steam generator 22. While the steam generator 22 could use electricity to generate the steam, such generators are generally too slow for the large quantities of steam needed for the present application. Thus, it is preferred to have the steam generator be fired by oil or some other petroleum product. Because of the common use of diesel fuel in farm equipment, it is anticipated that the steam generator will most commonly use diesel fuel. The fuel for the steam generator 22 is generally supplied from a boiler fuel tank 26 disposed below the generator. Of course, the fuel could be contained on a tractor (not shown) which pulls the dew simulator 10, and supplied to the steam generator by a fuel line.

Steam generated by the steam generator 22 is released into a steam flow hose 36. Typically the steam flow hose 36 will be made of a durable, yet flexible material. A steam regulator valve 40 is disposed at the connection of the steam flow hose 36 and steam generator 22, or along the flow hose, to control the amount of steam which is carried by the flow hose. Thus, the steam regulator valve 40 controls the amount of steam which is eventually released into the hay being baled. The steam regulator valve 40 may be manually controlled by an operator of the dew simulator 10 by a manual control 52 disposed on the tractor, or may be connected to a device which senses the moisture content of the hay, such as that shown in FIG. 1 at 56, and adjusts the regulator valve accordingly. The steam regulator valve 40 may be any regulator valve which will withstand the temperatures of the steam, and which may be controlled to properly meter steam flow therethrough.

The steam flow hose 36 carries the steam to a plurality of manifolds 44 which are shown in an exploded view in FIG. 1. In a typical embodiment, the manifolds 44 would be mounted on a hay baler (shown in FIGS. 2 and 3). Each of the manifolds 44 has a plurality of sprayers 48 disposed thereon to release steam into the hay as it is collected and passed through the baler. The process of treating the hay with steam is discussed in detail with respect to FIG. 2.

Also shown in FIG. 1 are a plurality of devices for use with the dew simulator. For example, a standard hitch 60 is used for connecting the water tank 14, etc., to a tractor (not shown) or a truck (not shown). A PTO shaft 64 is also provided to provide power to the baler (not shown).

A connection wire 68 is provided to connect the manual control 52 to the steam regulator valve 40. Likewise, a pair of hydraulic control hoses 72 are provided to control any aspects of the dew simulator or baler (not shown) which operate hydraulically.

Figure 2:
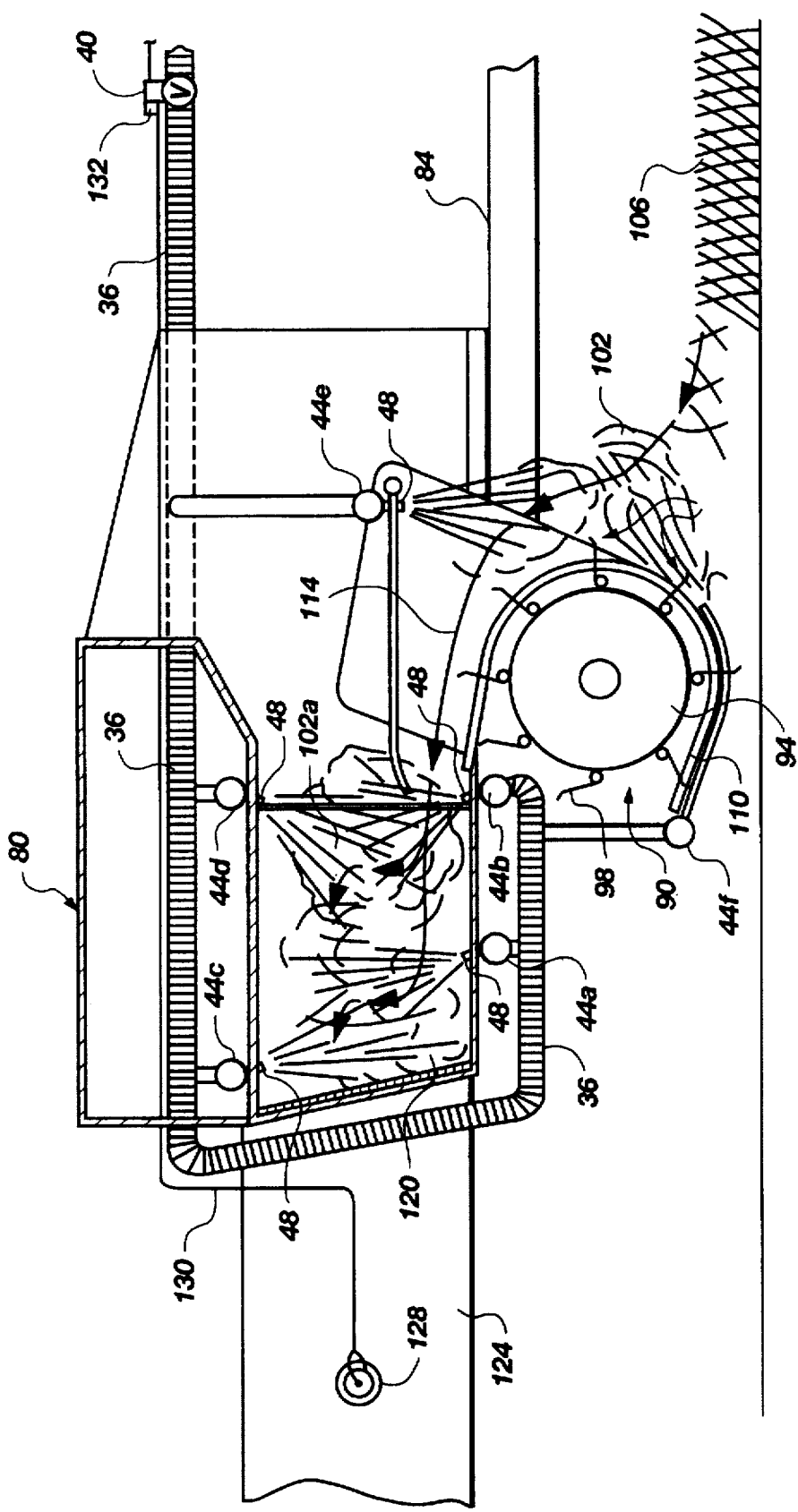
FIG. 2 shows a side cross-sectional view of a conventional baler with the steam injection system shown in FIG. 1 disposed thereon.
Figure 4:
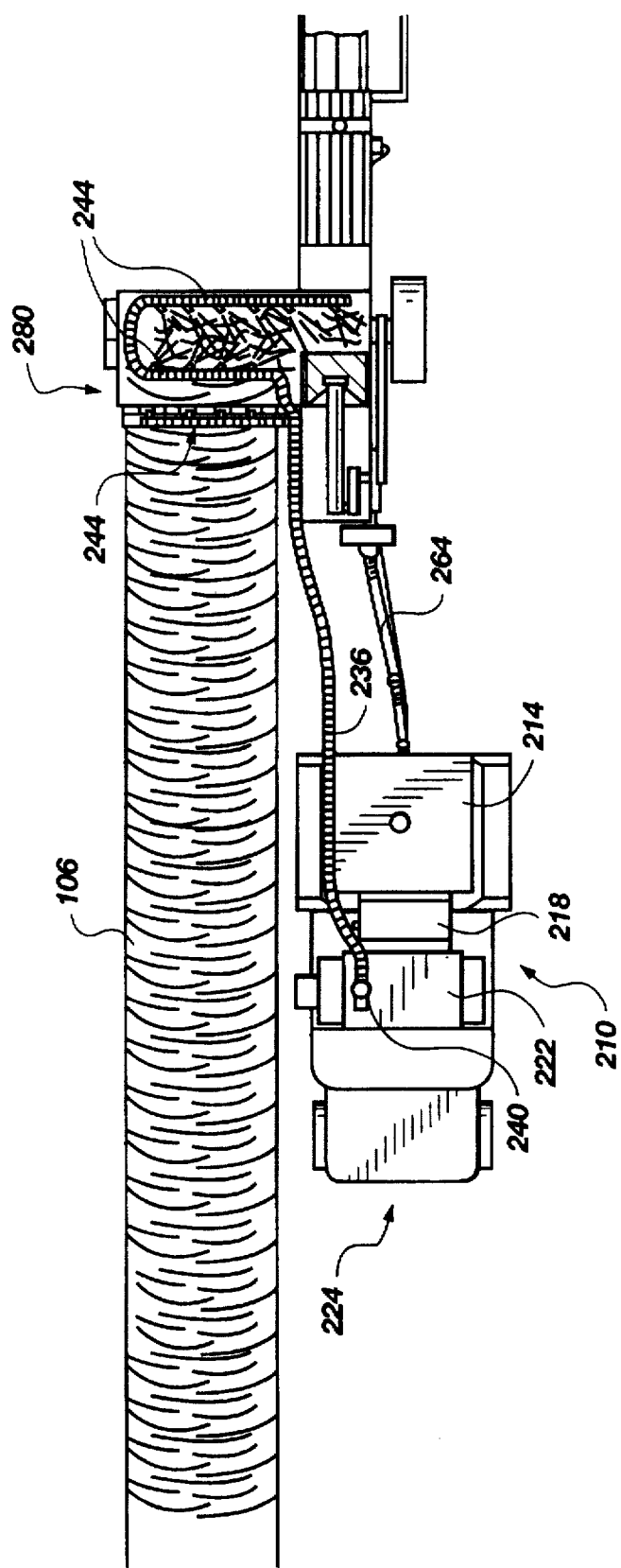
FIG. 4 shows an alternate embodiment of a dew simulator wherein the simulator is pulled by a truck.

Referring now to FIG. 2, there is shown a side cross-sectional view of a baler, generally indicated at 80. The baler 80 is pulled by a baler tongue 84 which attaches to the dew simulator or to a tractor or truck as is shown in FIG. 4.

Disposed rearwardly of the tongue 84 is a pick-up mechanism, generally indicated at 90. The pick-up mechanism 90 includes a rotating tube, commonly referred to as a pick-up head tube 94, with a plurality of fingers 98 extending outwardly therefrom so as to engage hay 102 of a windrow 106 and lift the hay into the baler 80. One or more rotor rods 110 are disposed about the pick-up head tube 94 to prevent hay from wrapping about the tube. Thus, the hay 102 follows a hay movement path 114 which continues from the pick-up mechanism 90 through the baler 80.

The pick-up mechanism 90 passes the hay into a feed chamber 120 within the baler 80. Within the feed chamber 120, at least one manifold 44a is disposed so as to spray steam into the hay 102a which is disposed within the feed chamber. In a typical embodiment, three manifolds 44a, 44b and 44c will be disposed in the feed chamber 120 so that steam emitted from their sprayers 48 thoroughly saturates the hay between about 1.5 and 0.5 seconds before it is passed into a compression chamber or baling chamber (not shown in FIG. 2).

In a preferred embodiment, a fourth manifold 44d is disposed to inject steam into the feed chamber 120. Additionally, two additional manifolds 44e and 44f are disposed adjacent the pick-up mechanism 90 so as to begin saturation of the hay 102 with steam as it is being lifted from the windrow 106. This helps to ensure penetration of all of the hay, but is done sufficiently close to the time of baling that little moisture will leave the hay prior to baling.

In the event that the baler 80 used includes a compression chamber, it is likely that a manifold for injecting steam will be used in the compression chamber to ensure that the desired moisture content is maintained until the actual baling of the hay has been completed. In light of the present disclosure, those skilled in the art will be able to determine the appropriate number of manifolds and spray nozzles 48 for each different type of baler without undue experimentation.

Once baled, the hay passes through a bale passage 124 and out of the baler 80. A moisture sensor 128, such as are well known to those skilled in the art, will be disposed along the bale passage 124. The moisture sensor 128 comes in contact with the bale of hay and sends a signal to determine the moisture content of the hay. The sensor 128 an electronic signal through a cable 130 to the moisture meter (not shown) at the operators area. The operator can then make adjustments to the regulator valve 40 as needed according to the moisture readings of the baled hay. The moisture sensor 128 can also be connected directly through a control mechanism 132 to the regulator valve 40 so as to make steam input adjustments automatically, as preset by the operator.

When using the present invention, the steam is released into the hay immediately before baling. This enables the hay to absorb moisture and retain flexibility during the baling process. The addition of the manifolds 44e and 44f allows the hay 102 to be moisturized as it is being lifted by the pick-up mechanism 90, thereby further reducing losses. The treated hay acquires the characteristics of high moisture hay and thus avoids being damaged as it is passed into the bailer.

The steam injected by the manifolds 44a–f is supplied by the steam flow hose 36 and regulated by the steam regulator valve 40 as discussed above. Of course, a separate steam control valve could be provided for each manifold 44a–f if desired.

By processing the hay immediately after treatment with the steam, a significant improvement is made in the moisture characteristics of the baled hay. The amount of steam injected prior to baling will typically be enough to raise the moisture reading of the baled hay to between 18 and 25 percent at the sensor 28. At such a moisture content reading, the hay is flexible and relatively soft to the touch, just as is hay having an actual moisture content between 18 and 25 percent. Thus, very little hay is lost due to fracturing as it is baled. However, the hay will typically have an actual moisture content which is between 12 and 15 percent.

Due to the partial saturation of the hay by the steam however, the moisture quickly leaves the hay. This is a primary reason that the prior art attempt to saturate the hay with steam prior to entry into the baler 80 have failed. If hay moistened by dew is baled at a moisture content between 18 and 25 percent, it will typically take several weeks, or even months for larger bales to dry below the desired 15 percent moisture content level.

This slow drying promotes spoilage and decreases the value of the hay. Presently producers are only able to sell about 30 percent of their hay yield to lucrative foreign and domestic markets because of the inconsistency in moisture content of the hay. By using the present invention, it is believed that 90 percent or more of the producer's yield will meet the moisture content standards for shipping to these lucrative foreign and domestic markets.

In contrast to dew moisturization, the steam treatment of the present invention results in a very temporary, simulated increase in the hay's moisture content. Because only the outermost layers of the hay tissue are effectively permeated when baled, the hay has similar baling characteristics as hay with high moisture content. However, the steam induced moisture is quickly absorbed to achieve an equilibrium within the hay after the bale has been formed. This lowers the moisture content readings to the 15 percent range, although the actual moisture content is essentially unchanged from when it was baled.

EXAMPLE 1

The embodiment discussed with respect to FIG. 2 was used to bale hay in accordance with the teachings of the present invention. The amount of steam injected into the hay was sufficient to obtain a moisture content reading of approximately 25 percent at the moisture sensor 128. As with similar moisture content due to dew moisturization, the hay was flexible and very little was lost during the baling process. At such levels, however, dew moisturized hay bales would take several weeks to dry in a small bale. However, the following day, the readings for the steam moisturized bales processed in accordance with the present invention had dropped to approximately 15 percent moisture, their actual moisture content. All of the bales were below 13 percent moisture in two to three days.

Those skilled in the art will appreciate that the ideal moisture content for shipping hay is about 12 percent. However, if harvested at such low moisture levels, much of the leafy forage is lost. With the present invention, all of the benefits high moisture baling (i.e. between 18 and 25 percent) were achieved, while obtaining hay having ideal shipping moisture within two to three days. Not only does the shortened drying time decrease the loss of time by the farmer waiting for the hay to dry, it significantly decreases the risk of spoilage and allows the farmer to obtain income more rapidly.

Figure 3:
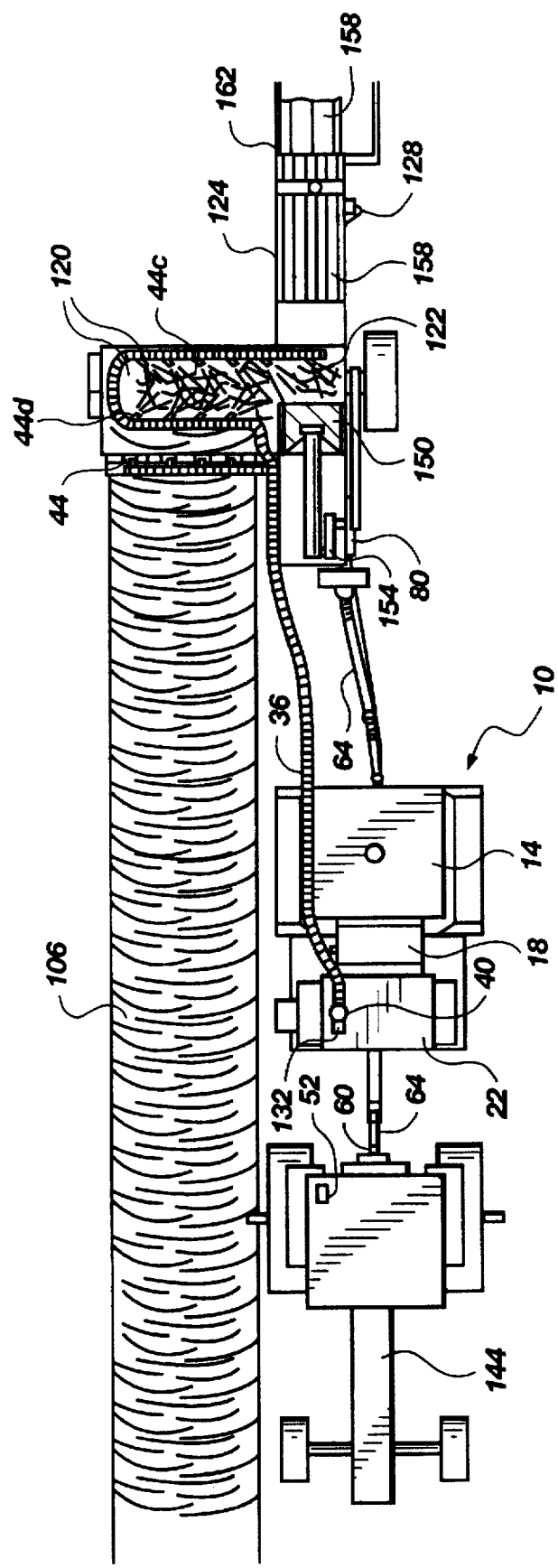
FIG. 3 shows a top view of a tractor, the boiler and water supply systems of the dew simulator and a baler as used in accordance with the principles of the present invention.

Referring now to FIG. 3, there is shown a dew simulator 10 disposed between a tractor 144 and a baler 80. As is apparent from FIG. 3, the tractor is a conventional tractor and is driven along side of the windrow 106. The tractor 144 is attached to the dew simulator 10 by the hitch 60 and the PTO shaft 64. The PTO shaft 64 passes under the dew simulator 10 and connects to the baler 80 so as to provide power to the baler.

As the tractor 144 is driven along the windrow 106, water provided from the water supply tank 14 is passed through the feed water system 18 and turned to steam in the steam generator 22. The steam is then passed through the steam flow hose 36 and the steam regulator 40 into the steam manifolds, of which manifolds 44c, 44d and 44e are shown in FIG. 3. From the steam manifolds 44c, 44d and 44e, the steam passes into the hay 102a in the baler 80. The moisturized hay in the feed chamber 120 is then passed to a baling chamber 122, where it is compressed by a piston 150 driven by a cam shaft 154 in a manner which will be well known to those who are skilled in the art.

The steam is injected into the hay 102a in the baler 80 at a rate of between about 1 and 200 pounds of steam for every ton of hay, and typically between 30 and 200 pounds in dry climates. The exact amount within this range is determined by the moisture content of the hay prior to application of steam and is adjusted responsive to readings from the sensor 128 which monitors each bales of hay as it is passed through the hay bale passage 124. The readings from the sensor 128 may be forwarded to the operator in the tractor 144 who may then adjust the amount of steam with the manual control 52. Alternatively, the sensor 124 communicates with the steam regulator valve via the control mechanism 132 which causes the regulator valve to adjust and thereby adjust the amount of steam entering the hay.

Of course, the control mechanism 132 could have appropriate algorithms programmed therein to monitor the moisture content of the hay. If the moisture content begins to increase above a desired range, the control mechanism causes the steam regulator valve 40 to decrease the amount of steam flowing through the hose 36 to the manifolds 44. Thus the baler 80 could be run during times of dew formation without risking spoilage of the hay being baled. If the dew formation was sufficiently high, the control mechanism could shut off steam flow and could even warn the operator that the dew moisture in the hay is becoming excessive and that harvesting should stop for the time being.

The baler 80 may be any conventional type of baler, such as the side loading type shown in FIG. 3. Center loading balers may also be used with a slightly modified version of the dew simulator 10 which is discussed with respect to a subsequent figure.

While shown in FIG. 3 as being disposed on the baler 80, a moisture sensor 128 could be disposed on the dew simulator 10 so as to monitor the hay before steam is injected into the windrow. While such a position would be advantageous as little if any hay would receive excess amounts of moisture, monitoring the moisture content of the windrow would usually be more difficult than the conventional practice of monitoring the bales.

Because adjustments can be made, and the hay can be moisturized at any convenient time, the present invention removes the need to bale hay during the brief window when dew condensation is increasing the moisture content of the hay. This, in turn, eliminates the need for producers to purchase large amounts of machinery which remain idle for most of the year.

Referring now to FIG. 4, there is shown another embodiment of the invention. The dew simulator 210 includes a water supply tank 214, a boiler feedwater system 218 and a steam generator 222 in a similar manner as the embodiment discussed in FIGS. 1 and 3. However, instead of being pulled by a tractor, the water supply tank 214, the feedwater system 218 and the steam generator 222 are mounted on the back of a truck, generally indicated at 224. The truck 224 will typically be modified to interact with the PTO shaft 264 to provide power to the baler, generally indicated at 280. Of course, some balers have their own engines for supplying power to the baler.

Steam is passed from the steam generator 222 through the steam regulator valve 240 and through the steam hose 236 to the manifolds 244 in the baler 280 in the same manner discussed above. Mounting the dew simulator 210 on a truck 224 provides several advantages. One advantage is that using the truck 224 to carry the dew simulator allows the tractor to be used for other projects which must be performed at the same time as the baling. Once the baling is complete, the dew simulator 210 need only be removed from the truck 224 so that it may be used for other conventional purposes.

Another advantage to using the truck 224 to pull the baler 280 is the decrease in overall length. By eliminating the dew simulator in the middle, maneuverability is increased. In many areas, the increase in maneuverability greatly increases convenience.

Figure 5:
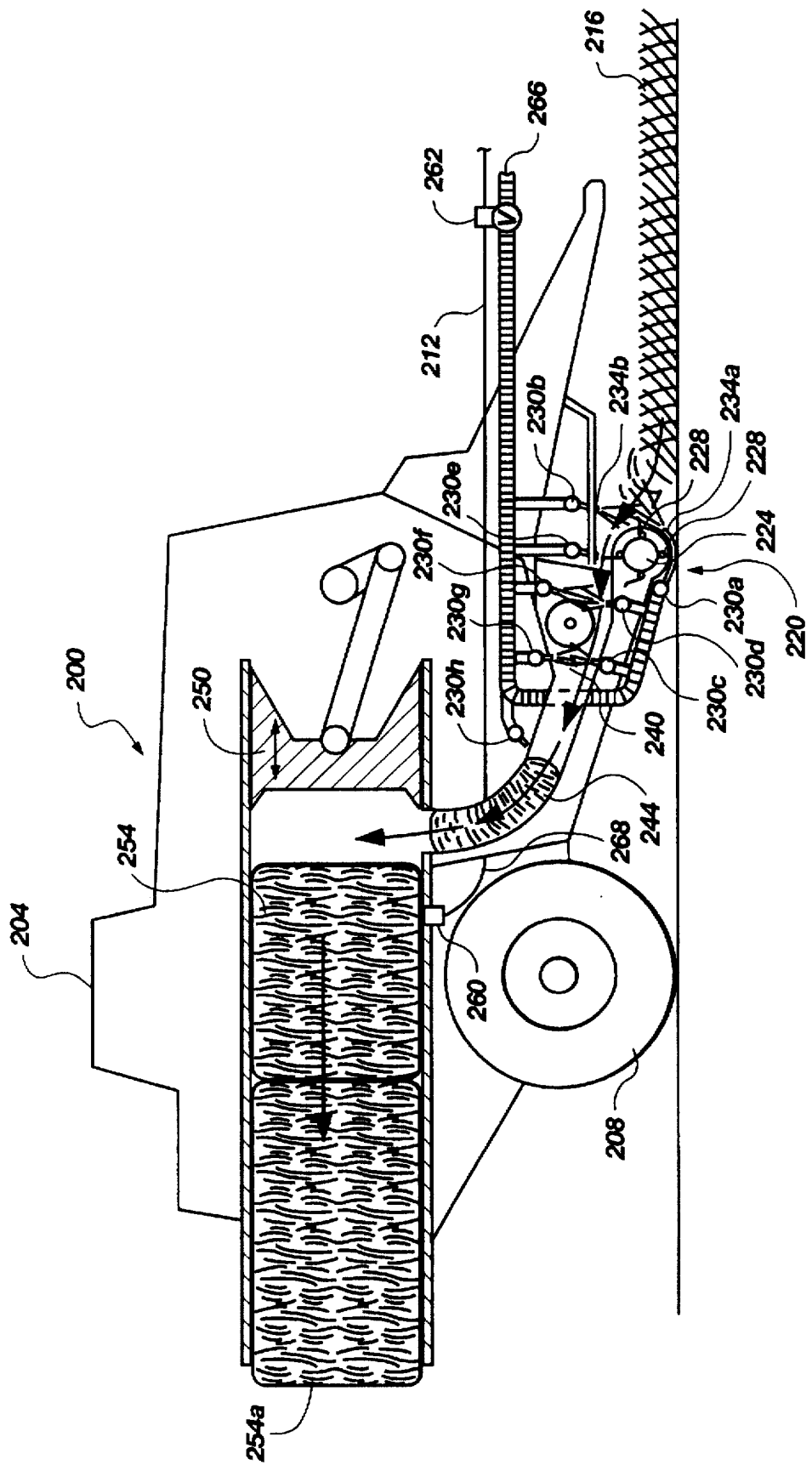
FIG. 5 shows a side cross-sectional view of yet another embodiment of a dew simulator made in accordance with the teachings of the present invention.

Referring now to FIG. 5, there is shown yet another embodiment of the present invention disposed in a conventional center pick-up baler, generally indicated at 200. The center pick-up baler 200 includes a housing 204 which is supported by a wheel 208, and is pulled by a tongue 212.

Disposed at the bottom of the baler 200 adjacent a windrow of hay 216 is a pick-up mechanism, generally indicated at 220. The pick-up mechanism 220 includes a pick-up head tube 224 with a plurality of fingers 228 disposed thereon for lifting hay from the windrow 216 and into the baler 200.

As with the embodiment shown in FIG. 2, a first manifold 230a is disposed so as to wrap partially around a bottom side of the pick-up head tube 224 so that a sprayer 234 of the manifold extends to an opposite side of the pick-up head tube and emits steam into the hay of the windrow 216 as it is being contacted by the fingers 228. A second manifold 230b is disposed above and slightly forward of the pick-up head tube 224 so that the sprayer 234b steams the hay as it is being lifted into the baler 200. While the quick steaming provided by the first and second manifolds 230a and 230b is usually insufficient to moisturize the hay for baling, it does moisturize and soften the hay as it is being lifted into the baler, thereby decreasing loss significantly.

Once in the baler 200, the hay is again subjected to steam from additional manifolds. Typically, two or more manifolds, such as manifolds 230c through 230f will be disposed in the feed chamber 240, and may be arranged along the compression/baling chamber 244, as shown at 230h before the hay is compacted by the piston 250 to form a bale 254.

Those skilled in the art will appreciate that the placement of the manifolds will be dependant on numerous factors such as the number and output of the manifolds, the type of baler, i.e. whether the baler is a large, 1 ton baler, a ½ ton baler, or a small center pick-up baler. The environment in which the baler 200 will be used will also be considered. Thus, a baler to be used in arid areas of the United States or South America will likely have more steam manifolds than those balers which are to be used where the moisture level is normally within a desired range, and the dew simulating baler is merely to enable baling in unusually dry weather.

After the bale 254 is formed, it is monitored by a moisture sensor 260 which communicates with the operator or a regulator valve, such as valve 262, which regulates steam flow through the flow hose 266. The sensor 260 typically communicates with the operator or regulator valve 262 by a cable 268. However, radio transmitters or other communication means can be used. The cable 268 is preferred due to its lower cost and generally higher reliability.

Figure 6:
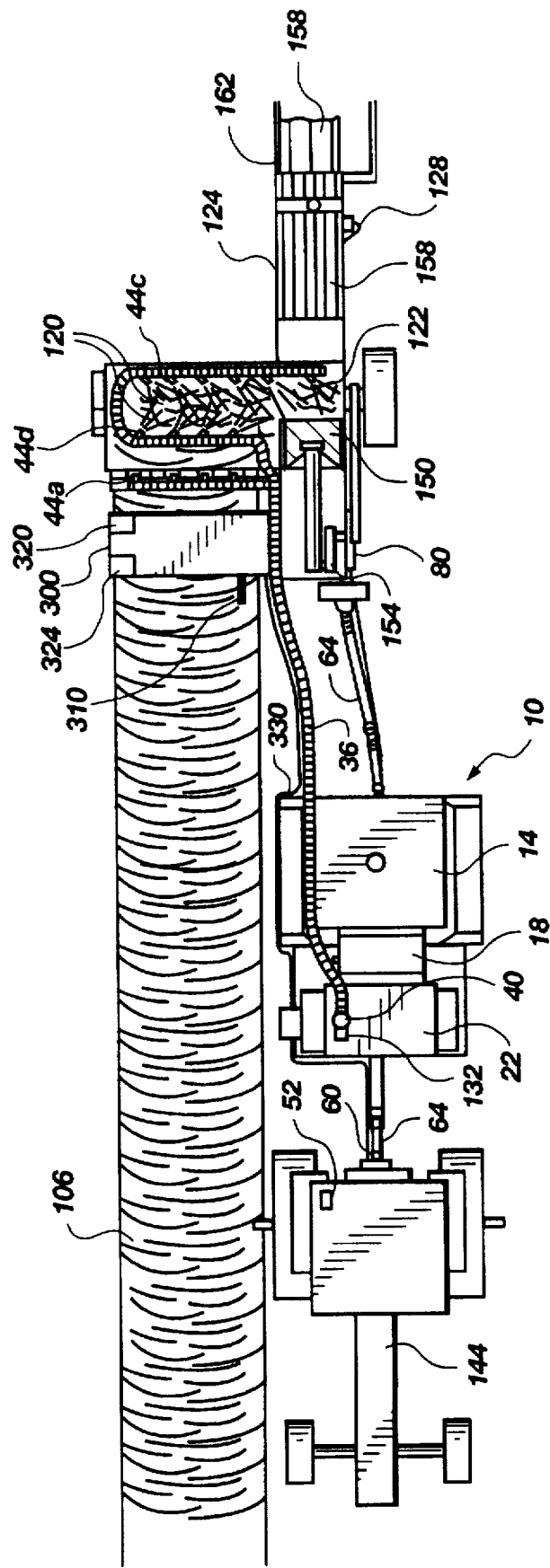
FIG. 6 shows a top view of yet another embodiment of a dew simulator made in accordance with the teachings of the present invention.

Referring now to FIG. 6, there is shown yet another embodiment of the present invention. The embodiment is substantially the same as that discussed in FIG. 3, and is numbered accordingly. Unlike the embodiment discussed in FIG. 3, however, the embodiment of FIG. 6 includes a cooler 300 which is formed integrally with or attached to the baler 80. The cooler 300 extends outwardly from the baler 80 so as to be positioned over the windrow 106 of hay. As the cooler 300 passes over the windrow, it blows cool air onto the hay to reduce the temperature of the hay. By cool air is meant air which has a temperature lower than the temperature of the hay or the air temperature adjacent the hay, which ever is lower. Those familiar with hay production in many areas of the south and western United States will appreciate that daytime temperatures can often exceed 100 degrees. It has been found that cooling the hay shortly before applying the steam from the manifolds 44a–d significantly improves absorption of the moisture by the hay. This is likely due to the fact that cooling the hay promotes condensation of the moisture contained in the steam, much in the same way that dew is formed by the cooling of air temperature.

The cooler 300 can be an evaporative cooler, often referred to as a swamp cooler, or may use refrigerants to cool the air being applied to the windrow 106 of hay. An evaporative cooler is likely the preferred embodiment, as the cooled air produced has a high moisture content, and in dry climates the evaporative cooler generally uses less energy for the cooling results achieved.

Typically, the cooler will be used during day light hours when the temperature of the hay or air exceeds 85 degrees. Of course, the humidity present in the air must also be considered. The drier the air, the more the hay will benefit. Once the temperature falls in the evening, the temperature of the hay usually cools sufficiently that the cooler 300 is not needed.

Experiments run using the cooler 300 show a substantial improvement in the ability of the hot hay to absorb the moisture provided by the steam if it is cooled prior to application of the steam. Typically, the cooler 300 will be disposed so as to cool the hay less than three seconds before it is lifted into the baler 80 and steamed. Preferentially, the hay will be cooled within about one second prior to steaming.

In addition to the cooler 300, a temperature probe 310 may be provided to determine the temperature of the hay and air adjacent the hay, as well as the amount of cool air, if any, that should be applied to the hay. If the hay temperature exceeds a predetermined temperature, 85 degrees Fahrenheit for example, the reading of the temperature probe 310 will signal the cooler 300 to being emitting cool air. The temperature probe 310, of course, could be formed integrally with a moisture sensor to thereby enable simultaneous control of cooling air and moisturizing steam.

A control mechanism 320 can also be provided to regulate the cooler. The control mechanism 320 may be formed integrally with the cooler and automatically adjust the temperature and air flow, or may be disposed on the tractor 144 and controlled by the user. Typically, however, it will be integrated with the controls for the steam treatment of the hay so that the two systems work in sync with one another to obtain hay bales having optimum moisture content.

To power the cooler 300, a fuel powered motor 324 may be provided, or a power cable 330 may be connected to the tractor or to the generator supplying electricity to the steam generator 22. Those skilled in the art will be familiar with numerous different types of motors which may be used to run the cooler and will be familiar with the relative advantages and disadvantages of each type.

In accordance with yet another aspect of the invention, the cooler 300 can comprise a water spray nozzle and a fan. The nozzle sprays the windrow 106 with a fine mist of water. The fan is then activated to blow air onto the moistened windrow—causing evaporation of the water. The evaporation of the water consumes heat and cools the hay in the windrow 106. Thus, an evaporative cooler is formed on the hay of the windrow, rather than just blowing cool air on the same.

Those skilled in the art will appreciate that the cooling of the hay may occur at any time during the harvesting process. However, it is believed to be most effective when done within about one second prior to steaming the hay.

Thus, there is disclosed a method and device for improving hay production. Unlike the prior art steam treatment systems which required the hay to be deposited in a steam chamber for a given amount of time to permeate the windrow, the present invention obtains almost instantaneous permeation of the windrow with steam so as to provide even moisturization of the hay, while at the same time maintaining the speed of conventional baling systems. Furthermore, the hay is more evenly moisturized, so as to minimize the risk of spoilage of some hay and inadequate moisturization of other hay.

Those skilled in the art will be familiar with numerous different modifications which could be made to the disclosed embodiments without departing from the scope or spirit of the present invention. The appended claims are intended to cover such modifications.

What is claimed is:

1. A baler for steam treating hay during the baling process, the baler comprising:

baling means for forming hay into a bale;

lifting means disposed adjacent to the baling means for lifting hay from a windrow into the baling means, the lifting means and baling means defining a continuous hay movement path for hay being baled; and steam injection means disposed adjacent the lifting means and baling means and along the hay movement path for injecting steam into hay moving along the hay movement path.

2. The baler for steam treating hay during the baling process of claim 1, wherein the steam injection means comprises at least one sprayer disposed adjacent the lifting means so as to direct steam into the hay as it is being lifted by the lifting means.

3. The baler for steam treating hay during the baling process of claim 2, wherein the lifting means comprises a plurality of rotating fingers, and wherein the steam injection means comprises a manifold disposed adjacent the lifting means, and a plurality of sprayers coupled to the manifold and disposed adjacent the rotating fingers of the lifting means.

4. The baler for steam treating hay during the baling process of claim 3, wherein the lifting means comprises a rotating pick-up tube with a plurality of fingers extending therefrom, and wherein the sprayers extend from the manifold so as to be disposed on an opposite side of the pick-up tube from the manifold.

5. The baler for steam treating hay during the baling process of claim 4, wherein the manifold is disposed generally above the pick-up tube, and wherein the sprayers extend generally downward from the manifold.

6. The baler for steam treating hay during the baling process of claim 3, wherein the sprayers are disposed between the rotating fingers.

7. The baler for steam treating hay during the baling process of claim 1 wherein the baling means comprises a feed chamber for receiving hay lifted by the lifting means, and wherein the steam injection means is disposed at least partially in the feed chamber so as to emit steam into the feed chamber.

8. The baler for steam treating hay during the baling process of claim 7, wherein the baling means comprises a compacting chamber disposed adjacent the feed chamber, and wherein the steam injection means is disposed at least partially in the compacting chamber so as to emit steam into the compacting chamber.

9. The baler for steam treating hay during the baling process of claim 7, wherein the steam injection means comprises at least one manifold coupled to the feed chamber so as to emit steam into the feed chamber.

10. The baler for steam treating hay during the baling process of claim 7, wherein the feed chamber has a top and a bottom, and wherein the steam injection means comprises a plurality of steam sprayers adjacent the top of the feed chamber and a plurality of steam sprayers adjacent the bottom such that hay passing through the feed chamber passes between the sprayers disposed adjacent the top of the feed chamber and the sprayers adjacent the bottom of the feed chamber.

11. A system for steam treating hay during baling, including the baler of claim 1, and further comprising cooling means disposed adjacent the lifting means for cooling the hay prior to injection of steam.

12. A system for steam treating hay during the baling process, including the baler of claim 1, and further comprising:
steam generation means disposed in communication with the steam injection means for providing steam to be injected into the hay.

13. The system for steam treating hay during the baling process of claim 12, wherein the steam generation means comprises a water supply tank and a steam generator for converting water to steam.

14. The system for steam treating hay during the baling process of claim 12, wherein the system comprises monitoring means for measuring moisture in the hay in the baler, and wherein the system further comprises means for regulating the flow of steam to the steam injection means.

15. The system for steam treating hay during the baling process of claim 12, wherein the system comprises monitoring means for measuring moisture in the hay in the baler, and manual adjustment means disposed adjacent the steam generation means for regulating the amount of steam released into the steam injection means.

16. The system for steam treating hay during the baling process of claim 12, wherein the system comprises cooling means disposed adjacent the baler for cooling hay prior to injection of steam.

17. The system for steam treating hay during the baling process of claim 12, wherein the system comprises monitoring means for measuring temperature of the hay.

18. A method for baling hay comprising the sequential steps of:
a) moving hay into a baler;
b) injecting steam into the baler so as to subject the moved hay to steam in sufficient quantities to increase the moisture content in the hay; and
c) forming the hay into bales while the increased moisture content is still present.

19. The method of claim 18, wherein step a) comprises, more specifically, lifting hay into the baler.

20. The method of claim 19, wherein step b) further comprises applying steam to the hay as it is being lifted into the baler.

21. The method of claim 18, wherein step b) comprises, more specifically, moving the hay into a feed chamber in the baler and applying steam to the hay while the hay is in the feed chamber.

22. The method of claim 18, wherein step b) further comprises passing the hay into a compacting chamber prior to forming the hay into bales.

23. The method of claim 22, further comprising subjecting the hay to steam while the hay is in the compacting chamber.

24. The method of claim 23, further comprising monitoring the moisture content of the bales of hay.

25. The method of claim 24, wherein step (b) comprises subjecting the hay to sufficient steam so that the hay has a moisture content reading of between about 18 and 25 percent when monitored.

26. The method of claim 25, wherein the method further comprises varying the amount of steam to which the hay is subjected so as to maintain a moisture content reading of the hay between about 18 and 25 percent.

27. The method of claim 26, wherein the amount of steam is varied responsive to the monitored moisture content of the hay.

28. The method of claim 18, wherein step b) comprises, more specifically, subjecting the hay to between 1 and 200 pounds of steam for every ton of hay.

29. The method of claim 18, wherein the method comprises, more specifically applying steam to the hay less than two seconds prior to forming the hay into bales.

30. The method of claim 29, wherein the method comprises applying steam to the hay between one-half second and one and one-half seconds prior to forming the hay into bales.

31. The method of claim 18, wherein the method further comprises cooling the hay prior to moving the hay into the baler.

32. The method of claim 31, wherein the method comprises subjecting the hay to cool air.

33. The method of claim 31, wherein the method further comprises monitoring the temperature of the hay and subjecting the hay to cool air if the temperature of the hay is above a predetermined temperature.

34. A method for optimizing moisture content in a bale of hay compacted by a baler, the method comprising:
(a) injecting steam into a baler so as to subject hay to an effective amount of steam prior to baling so as to raise the moisture content of the hay within the baler and to obtain a moisture content reading of between 18 and 25 percent;
(b) baling the hay while the moisture content reading is at least 18 percent; and
(c) allowing the moisture to diffuse within hay for not more than three days so as to obtain a moisture content reading of less than 15 percent water.

35. The method according to claim 34, wherein the method comprises lifting the hay into a baler and applying steam to the hay as it is being lifted so as to minimize damage to the hay.

36. The method according to claim 34, wherein the method comprises moving the hay through a feed chamber of a baler and applying steam to the hay while the hay is in the feed chamber.

37. The method according to claim 36, wherein the method comprises passing the hay from the feed chamber to a compacting chamber, and applying steam to the hay while the hay is in the compacting chamber.

38. The method according to claim 34, wherein the method further comprises cooling the hay prior to applying steam to the hay.

39. A method for improving the absorption of steam by hay, wherein the hay has an initial temperature, the method comprising:

(a) cooling the hay to a temperature below the initial temperature by artificial means; and (b) subjecting the hay to steam while the temperature of the hay remains below the initial temperature.

40. The method according to claim 39, wherein step (a) comprises blowing cool air from a cooling apparatus onto the hay prior to subjecting the hay to steam.

41. The method according to claim 39, wherein step (b) comprises, more specifically, subjecting the hay to steam within 3 seconds of cooling the hay.

42. The method according to claim 39, wherein step (b) comprises, more specifically, subjecting the hay to steam within about 1 second of cooling the hay.

43. The method according to claim 39, wherein step (a) comprises, more specifically, spraying water onto the hay and blowing air into the hay so as to evaporate the water and thereby cool the hay.

* * * * *